2,999,098
Patented Sept. 5, 1961

2,999,098
BIS-HALOCYCLOALKENYL DERIVATIVES OF ALKYLIDENEDIOXYBENZENES
Ralph B. Thompson, Hinsdale, Ill., assignor, by mesne assignments, to Universal Oil Products Company, Des Plaines, Ill., a corporation of Delaware
No Drawing. Filed Nov. 13, 1957, Ser. No. 696,019
5 Claims. (Cl. 260—340.5)

This invention relates to new compositions of matter and to a method for the preparation thereof. More specifically, the invention relates to a method for preparing bis-halocycloalkenyl derivatives of alkyldienedioxybenzenes.

It is an object of this invention to prepare halocycloalkenyl derivatives of substituted benzenes.

A further object of this invention is to prepare bis-polyhalocycloalkenyl derivatives of alkylidenedioxybenzenes which may be used as insecticidal compositions.

One embodiment of this invention resides in a process for the preparation of a bis-halocycloalkenyl derivative of an alkylidenedioxybenzene which comprises condensing catechol with an unsaturated halide, rearranging the resulting dialkenyl ether to form a dialkenyl catechol, reacting said dialkenyl catechol with a compound selected from the group consisting of ketones and aldehydes, thereafter condensing the resultant dialkenyl alkylidenedioxybenzene with a compound selected from the group consisting of haloalkadienes and halocycloalkadienes, and recovering the resultant bis-halocycloalkenyl derivative of an alkylidenedioxybenzene.

A further embodiment of the invention resides in a process for the preparation of a bis-halocycloalkenyl derivative of an alkylidenedioxybenzene which comprises condensing catechol with allyl chloride, rearranging the resultant diallyl ether to form a diallyl catechol, reacting said diallyl catechol with methyl propyl ketone, thereafter condensing the resultant diallyl alkylidenedioxybenzene with a compound selected from the group consisting of haloalkadienes and halocycloalkadienes, and recovering the resultant bis-halocycloalkenyl derivative of an alkylidenedioxybenzene.

A specific embodiment of the invention is found in a process for the preparation of a bis-polyhalocycloalkenyl derivative of an alkylidenedioxybenzene which comprises condensing catechol with allyl chloride, rearranging the resultant diallyl ether to form a diallyl catechol, reacting said diallyl catechol with methyl propyl ketone, thereafter condensing the resultant diallyl-1,2-isopentylidenedioxybenzene with hexachlorocyclopentadiene, and recovering the resultant bis-(1,4,5,6,7,7-hexachloro-5-norbornen-2-ylmethyl)-1,2-(1-methylbutylidene)-dioxybenzene.

Yet another embodiment of this invention is found in a bis-halocycloalkenyl derivative of an alkylidenedioxybenzene.

Other objects and embodiments referring to alternative unsaturated halides, ketones, aldehydes, haloalkadienes and halocycloalkadienes will be found in the following further detailed description of the invention.

The compounds formed by the process of this invention, comprising bis-halocycloalkenyl derivatives of an alkylidenedioxybenzene, will find a wide variety of uses in the chemical field, especially as insecticides. For example, the desired reaction product resulting from the process of (1) condensing catechol with allyl chloride, (2) rearranging the resultant diallyl ether to form diallyl catechol, (3) reacting said diallyl catechol with cyclohexanone, and thereafter (4) condensing the resultant compound with hexachlorocyclopentadiene, namely, a bis - (1,4,5,6,7,7 - hexachloro - 5 - norbornen - 2 - ylmethyl)-1,2-cyclohexylidenedioxybenzene is active as an insecticide, especially against houseflies. In addition, the reaction products of this invention may also be used as an intermediates in the preparation of resins, pharmaceuticals, plastics, etc. For purposes of this invention the term "halocycloalkenic derivatives" will refer to halocycloalkenes, polyhalocycloalkenes, halobicycloalkenes and polyhalobicycloalkenes. In addition, the term "halo" will refer to both mono and polyhalo compounds.

Unsaturated halo substituted compounds comprising mono olefinic halides, which may be condensed with the catechol to form dialkenyl ethers which are subsequently subjected to rearrangement to form dialkenyl catechols, include aliphatic mono olefins containing a halogen substituent having an atomic weight of from 35 to 127 (i.e. chlorine, bromine and iodine) such as allyl chloride, allyl bromide, allyl iodide, methallyl chloride, methallyl bromide, methallyl iodide, crotony chloride, crotony bromide, crotonyl iodide, the isomeric pentenyl, hexenyl, heptenyl, octenyl, nonenyl and decenyl chlorine, bromine and iodine substituted compounds, etc. The dialkenyl catechols which are formed upon rearrangement of the dialkenyl ethers are predominantely 3,6-dialkenyl catechols, although there are also minor amounts of 3,4-, 3,5- and possibly 4,5-dialkenyl catechols present.

The dialkenyl catechols are then reacted with oxy-organic compounds, such as ketones and aldehydes or equivalents such as methylene chloride, methylene bromide, ethylidene chloride, ethylidene bromide, propylidene chloride, propylidene bromide, etc., said ketones and aldehydes including formaldehyde, acetaldehyde, propionaldehyde, butyraldehyde, valeraldehyde, caproaldehyde, heptaldehyde, caprylaldehyde, nonylaldehyde, capricaldehyde, etc., acetone methyl ethyl ketone, methyl propyl ketone, methyl butyl ketone, methyl pentenyl ketone, methyl hexyl ketone, etc., ethyl propyl ketone, ethyl butyl ketone, ethyl pentenyl ketone, ethyl hexyl ketone, etc., dipropyl ketone, propyl butyl ketone, propyl pentenyl ketone, etc., cyclopentanone, cyclohexanone, cycloheptanone, etc., to form dialkenyl alkylidenedioxybenzenes.

The resultant dialkenyl alkylidenedioxybenzene which results from the reaction between the aforementioned oxygenated organic compounds and the dialkenyl catechol is then reacted with unsaturated compounds comprising conjugated diolefins containing a halogen substituent having the general formula:

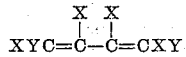

in which X is independently selected from the group consisting of hydrogen, alkyl, or halogen radicals having an atomic weight of from 35 to 127 (i.e. chlorine, bromine or iodine), at least one X being halogen and Y is independently selected from the group consisting of alkyl, haloalkyl, and hydrogen radicals; or polyhalocycloalkadienes having the general formula:

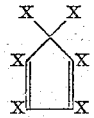

in which X has the same meaning as above. Examples of these compounds include haloalkadienes such as 1-chloro-1,3-butadiene,
1,3-, 2,3- and 1,4-dichloro-1,3-butadiene,
1-bromo-1,3-butadiene,
1,3-, 2,3- and 1,4-dibromo1,3-butadiene,
1,3-, 2,3-, and 1,4-diiodo-1,3-butadiene,
1,2,3-trichloro1,3-butadiene,
1,2,3-tribromo-1,3-butadiene,
1-iodo-1,3-butadiene, 1,2-diiodo-1,3-butadiene,
1,2,3-triiodo-1,3-butadiene,
1,2,4-trichloro-1,3-butadiene,
1,2,4-tribromo-1,3-butadiene,
1,2,4-triiodo-1,3-butadiene,
1,2,3,4-tetrachloro-1,3-butadiene,
1,2,3,4-tetrabromo-1,3-butadiene,
1,2,3,4-tetraiodo-1,3-butadiene,
1,3-dichloro-2-methyl-1,3-butadiene,
1,4-dichloro-2-methyl-1,3-butadiene,
1,3,4-trichloro-2-methyl-1,3-butadiene,
1,4-dichloro-2-chloromethyl-1,3-butadiene,
1,4-dichloro-2-dichloromethyl-1,3-butadiene,
1,3-dibromo-2-methyl-1,3-butadiene,
1,4-dibromo-2-methyl-1,3-butadiene,
1,4-dibromo-2-bromomethyl-1,3-butadiene,
1,4-dibromo-2-dibromomethyl-1,3-butadiene,
1,3,4-tribromo-2-methyl-1,3-butadiene,
1,3-diiodo-2-methyl-1,3-butadiene,
1,4-diiodo-2-methyl-1,3-butadiene,
1,4-diiodo-2-iodomethyl-1,3-butadiene,
1,4-diiodo-2-diiodomethyl-1,3-butadiene,
1,3,4-triiodo-2-methyl-1,3-butadiene, etc;

and halocycloalkadienes such as halogenated 1,3-cyclopentadienes which for purposes of this invention will be designated as halogenated cyclopentadienes including 1-chlorocyclopentadiene, 1,2- and other dichlorocyclopentadienes, 1,2,3- and other trichlorocyclopentadienes, 1,2,3,4- and other tetrachlorocyclopentadienes, 1,2,3,4,5- and other pentachlorocyclopentadienes, hexachlorocyclopentadiene, the corresponding bromo- and iodo-derivatives, etc. It is also contemplated within the scope of this invention that polyhalo substituted conjugated cyclohexadienes such as 1,2-dichloro-1,3-cyclohexadiene,
1,2,3-trichloro1,3-cyclohexadiene,
octachloro-1,3-cyclohexadiene, etc.,
1,2-dibromo-1,3-cyclohexadiene,
1,2,3-tribromo-1,3-cyclohexadiene,
octabromo-1,3-cyclohexadiene,
1,2-diiodo-1,3-cyclohexadiene,
1,2,3-triiodo-1,3-cyclohexadiene,
octaiodo-1,3-cyclohexadiene, etc.

may also be used. In addition, it is also contemplated that polyhaloalkadienes and polyhalocycloalkadienes which are used in this process may contain more than one species of halo substituents, such as for example, 1,2-dichloro-3-bromo-1,3-butadiene,
1-chloro-3-bromo-1,3-butadiene,
1-iodo-3-chloro1,3-butadiene,
2-bromo-3-chloro-1,3-butadiene,
1,4-dichloro-2-bromomethyl-1,3-butadiene,
1,4-dichloro-2-iodomethyl-1,3-butadiene,
1-chloro-2-bromocyclopentadiene,
1,2-dichloro-3-bromocyclopentadiene,
1,2-dichloro-5,5-dibromocyclopentadiene, etc., although not necessarily with equivalent results.

The various steps of the process of this invention will take place under varying conditions of temperature and pressure as well as a difference in an alkaline or acidic medium. For example, the first step of this process in which the aliphatic olefin containing a halogen substituent is condensed with catechol to form a dialkenyl ether will take place at temperatures in the range of from about atmospheric to about 100° C. or more and generally at atmospheric pressure. However, if higher temperatures are used the pressure will be correspondingly increased so that a portion of the reactants will remain in the liquid phase, said pressures ranging from about 2 to about 100 atmospheres or more. In addition the condensation will take place in a basic medium, the alkalinity being provided by the addition of an alkaline compound including the hydroxides, carbonates, acetates, etc., of the alkaline earth metals and alkali metals such as potassium hydroxide, sodium hydroxide, lithium hydroxide, cesium hydroxide, rubidium hydroxide, calcium hydroxide, strontium hydroxide, barium hydroxide, potassium carbonate, sodium carbonate, lithium carbonate, cesium carbonate, rubidium carbonate, calcium carbonate, strontium carbonate, barium carbonate, potassium acetate, sodium acetate, lithium acetate, cesium acetate, rubidium acetate, calcium acetate, strontium acetate, barium acetate, etc. The second step of the process in which the dialkenyl ether is rearranged to form dialkenyl catechols will take place at temperatures ranging from about 150° to about 300° C. or more and at pressures ranging from atmospheric to about 100 atmospheres or more, the pressure in this step, as in the first step of the process, being dependent upon the temperature and being sufficient to maintain a portion of the products in the liquid phase.

The third step of this process in which the dialkenyl catechol is reacted with the oxygenated organic compound such as a ketone or aldehyde to form the corresponding dialkenyl alkylidenedioxybenzene will take place at temperatures ranging from about atmospheric to about 200° C. or more and at pressures ranging from about atmospheric to about 100 atmospheres or more. This step of the process is effected in an acidic medium, said acidity being provided by the introduction of acids such as organic acids including benzene sulfonic acid, toluene sulfonic acid, or inorganic acids such as sulfuric acid, nitric acid, hydrochloric acid, phosphoric acid, etc. The final step of the process in which the dialkenyl alkylidenedioxybenzene is reacted with the compounds selected from the group consisting of haloalkadienes and halocycloalkadienes is also effected at elevated temperatures in the range of from about 120° to about 250° C. and at pressures in the range of from about atmospheric to about 100 atmospheres or more, the pressure in this step, as in the preceding ones, being dependent upon the temperature employed in the particular step and being sufficient to maintain a portion of the reactant in the liquid phase. In addition, if so desired, the various steps of the process may take place in the presence of inert organic solvents including aromatic solvents such as benzene, toluene, o-, m- and p-xylene, ethyl benzene, etc., alcohols such as methyl alcohol, ethyl alcohol, propyl alcohol, etc.; ethers such as dimethyl ether, diethyl ether, dipropyl ether, saturated low molecular weight alcohols such as pentane, hexane, heptane, etc., or acetone, etc.

The desired insecticide will have the generic formula:

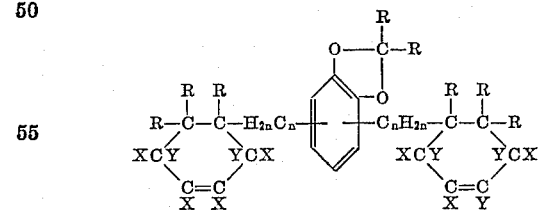

if a haloalkadiene is used in the fourth step, or the generic formula:

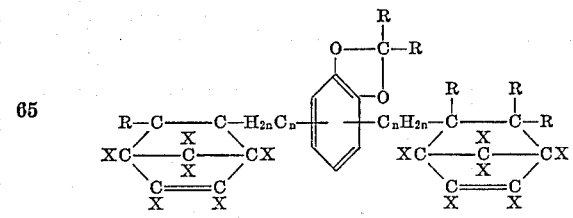

if a halocycloalkadiene is used in the fourth step. In the above formulae the several R substituents are independently selected from the group consisting of hydrogen and alkyl radicals, the several X substituents are independently selected from the group consisting of hydrogen, alkyl and halogen radicals (at least one X group being halogen), the Y substituents are independently selected from the group consisting of hydrogen, haloalkyl and alkyl, and $n$ is an integer of from 0 to 8. Examples of products which fall within the above formulae and which will constitute new compositions of matter include 3,4-, 3,5- and 3,6-bis-(1,4,5,6,7,7-hexachloro-5-norbornen-2-ylmethyl)-1,3-(1-methylbutylidene)dioxybenzene,
3,4-, 3,5- and 3,6-bis-(1,4,5,6,7,7-hexachloro-5-norbornen-2-yl)-1,2-(1-methylbutylidene)dioxybenzene,
3,4-, 3,5- and 3,6-bis-(1,4,5,6,7,7-hexachloro-5-norbornen-2-ylmethyl)-1,2-cyclohexylidenedioxybenzene,
3,4-, 3,5- and 3,6-bis-(1,4,5,6,7,7-hexachloro-5-norbornen-2-yl)-1,2-cyclohexylidenedioxybenzene,
3,4-, 3,5- and 3,6-bis-(1,4,5,6,7,7-hexachloro-5-norbornen-2-ylmethyl)-1,2-isopropylidenedioxybenzene,
3,4-, 3,5- and 3,6-bis-(1,4,5,6,7,7-hexachloro-5-norbornen-2-yl)-1,2-isopropylidenedioxybenzene,
3,4-, 3,5- and 3,6-bis-(1,3-dichloro-1-cyclohexen-4-ylmethyl)-1,2-isooctylidenedioxybenzene,
3,4-, 3,5- and 3,6-bis-(1,3-dichloro-1-cyclohexen-4-yl)-1,2-isooctylidenedioxybenzene,
3,4-, 3,5- and 3,6-bis-(1,3-dichloro-1-cyclohexen-4-ylmethyl)-1,2-cyclohexylidenedioxybenzene,
3,4-, 3,5- and 3,6-bis-(1,3-dichloro-1-cyclohexen-4-yl)-1,2-cyclohexylidenedioxybenzene,
3,4-, 3,5- and 3,6-bis-(1,3-dichloro-1-cyclohexen-4-ylmethyl)-1,2-isopropylidenedioxybenzene,
3,4-, 3,5- and 3,6-bis-(1,3-dichloro-1-cyclohexen-4-yl)-1,2-isopropylidenedioxybenzene, etc.

The volatility of the insecticides produced according to this invention is, of course, dependent upon their molecular weight and when a product having a low volatility is especially desired in a particular application, such as a high degree of retentivity or activity to which the pesticide is applied, the molecular weight may be raised by using relatively high boiling components in the third step of the process that is, the particular ketone or aldehyde used, and also by using a relatively high boiling component in the final step of the process, that is, a haloalkadiene or halocycloalkadiene having a relatively high boiling point.

The physical properties of the present bis-halocycloalkenyl derivatives of alkylidenedioxybenzenes, and the effects they have on entomological forms of life make them particularly desirable as insecticides and insect repellents, the compounds having many of the features desired for materials of this purpose. They are, for example, toxic to insects which are destructive of plant life and materials normally subject to insect infestation, their toxic effects being manifested by contact of the insect with the poison. The insecticides comprising the compounds of the present invention are thus effective against chewing as well as sucking types of insects. In addition, the compounds may be made sufficiently volatile so that when applied to plant life intended for human consumption, the plants when harvested and after allowing a reasonable time for evaporation of the applied insecticides therefrom retain insufficient quantities of the toxicant to prevent use of the plants as food. On the other hand, the compounds may be made of sufficiently limited volatility to be retained on the insect for the time required to accomplish their toxic effects. The volatility and retentive capacity of the compounds may be varied at will by combining them with suitable fixing agents which reduce or promote their volatilization, as desired. Thus the compounds may be dissolved in a suitable high boiling solvent, such as a mineral or vegetable oil, petroleum, etc., a wax such as paraffin wax, beeswax, etc.; a high molecular weight alcohol or ether such as myricyl alcohol, dibutyl ether, etc.; or they may be emulsified with water by the addition of an emulsifying agent, such as a surface active agent, to the mixture of the components. The latter solvents and dispersants may also be employed for the specific purpose of reducing the concentration of insecticides to the desired level in specific insecticide formulations. The particular formulation of active components in combination with the solvent or dispersant will depend upon its application. Compositions containing as high as 20% of active component may be preferred in some instances to allow deep penetration of the insecticides, as in the treatment of fibrous material, such as wood, for extinction of particular infestation, for example, wood termites. For other purposes, the required concentration of active components in the formulation may be as low as 0.1% as for example in the treatment of fabrics for destroying moth larvae. In utilizing the present insecticidal compounds against most insects, a composition containing from about 0.1% to about 5% by weight of the active component is highly effective. The choice for the most desirable concentration and also whether or not the insecticide is dissolved or emulsified in water depends upon the method utilized to apply the insecticidal composition to the infested article. In addition to the use of water as a solvent, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide which, upon release of pressure therefrom, vaporizes the liquid as a mist containing suspended quantities of the active component, thus providing a convenient spraying method of applying the insecticide.

The process of this invention may be effected in any suitable manner and may comprise either a batch or a continuous type operation. For example, when a batch type operation is used a quantity of the starting materials comprising the catechol, the mono olefinic halide, the alkaline material and, if so desired, an inert organic solvent are placed in a condensation apparatus provided with heating and stirring means. The flask is then heated to the desired temperature and pressure and maintained thereat for a predetermined period of time while stirring vigorously. At the end of this time the desired dialkenyl ether is recovered by conventional means such as extraction and separation and heated in a second flask or, if so desired, returned to the original flask and heated therein, to the desired temperature.

The desired intermediate condensation product, comprising the dialkenyl catechols is recovered and separated from any unreacted material and placed in another condensation apparatus along with the previously selected oxygenated organic compound such as a ketone or aldehyde and the acidic material necessary for the desired medium. If so desired this reaction may also take place in the presence of an inert organic solvent which is added to the reaction mixture. The reaction apparatus is then heated to the desired temperature and maintained thereat for a predetermined residence time after which the flask and contents thereof are cooled to room temperature. The reaction mixture is washed to remove the acidic medium and the solvent is also removed by evaporation in vacuo. The residue, comprising the dialkenyl alkylidenedioxybenzene is then placed in still another condensation apparatus which, if so desired, may be the original flask and reacted with the haloalkadiene or halocycloalkadiene at a predetermined temperature and pressure for the desired residence time. At the end of this time the flask and contents thereof are cooled to room temperature and the desired product, comprising the bis-halobicyclo derivative of an alkylidenedioxybenzene is separated and recovered by conventional means such as, for example, fractional distillation, crystallization, etc.

Another method of effecting the condensation reaction of the present invention is by a continuous type operation. In this type of operation the starting materials comprising catechol and the unsaturated halide are continuously charged to a reactor which is maintained at the proper operating conditions of temperature and pressure. The reactor may comprise an unpacked vessel or coil or may be lined with an adsorbent packing material such as fire brick, alumina, Berl saddles and the like. If so desired, an inert solvent of the type hereinbefore set forth may also be added through a separate line or admixed with one of the other of the starting materials prior to entry into said reactor and charged thereto in a single line. Likewise, the alkaline material which provides the basic medium for the reaction may also be charged to said reactor through a separate line or, if so desired, admixed with one of the other of the starting materials prior to entry into said reactor and charged thereto in a single line. The reaction product, comprising the dialkenyl ether is continuously withdrawn from the reactor, separated from the reactor effluent and continuously charged to a second reactor, while the unreacted starting materials are separated and recharged to the first reactor as a portion of the feed stock. The second reactor is also maintained at the proper operating conditions of temperature and pressure where the dialkenyl ether is rearranged to form the dialkenyl catechols. The desired product is also continuously withdrawn from this second reactor and separated from any unreacted dialkyl ether, the latter being recycled to form a portion of the feed stock to the second reactor, while the former is continuously charged to a third reactor. This third reactor like the preceding two is maintained at the proper operating conditions of temperature and pressure and may be an unlined vessel or coil or may be lined with an adsorbent packing material of the type hereinbefore set forth. The desired oxygenated organic compound such as the ketone or aldehyd is continuously charged to this third reactor. An inert organic solvent of the type hereinbefore set forth may also be continuously charged to this reactor through separate means or, if so desired, may be admixed with the ketone or aldehyde prior to entry into said reactor and charged thereto in a single stream. In addition a small amount of the acidic material, sufficient to maintain the reaction in an acidic medium, is also continuously charged to this reactor. The reaction product, comprising the dialkenyl alkylidenedioxybenzene is continuously withdrawn, separated from the reactor effluent (which is separated and recycled to form a portion of the feed stock to the third reactor) and continuously charged to a fourth reactor similar to those hereinbefore described. In the fourth deactor the dialkenyl alkylidenedioxybenzene is reacted with the halocycloalkene or halocycloalkadiene for a predetermined time after which the desired condensation product, comprising the bis-halocycloalkenyl derivative of an alkylidenedioxybenzene is separated and purified by conventional means hereinbefore set forth while the reactor effluent is recycled to form a portion of the feed stock for the fourth reactor.

The following examples are given to illustrate the process of the present invention, which, however, are not intended to limit the generally broad scope of the present invention in strict accordance therewith.

*Example I*

A solution of 180 g. of sodium hydroxide dissolved in 500 cc. of water and 500 cc. of methanol was placed in an alkylating flask provided with heating and stirring means. A mixture of 220 g. of catechol and 320 g. of allyl chloride was added to the solution while vigorously stirring the reaction mixture. Nitrogen was also bubbled through the solution which was stirred vigorously for 2 hours and allowed to stand for 16 hours. The mixture was then heated to reflux temperature for an additional two hours while continuously stirring said mixture. At the end of this time an additional amount of water was added to the basic solution and the organic material contained therein was extracted with benzene. The organic reaction product was heated in an oil bath at a temperature of 210° C. and maintained thereat for a period of about 0.25 hour. At the end of this time the flask and contents thereof were cooled to room temperature and the reaction mixture subjected to fractional distillation under reduced pressure.

A mixture comprising 46.6 g. of diallyl catechol, 24 g. of cyclohexanone and 250 cc. of toluene was placed in an alkylating flask and a trace of benzene sulfonic acid added thereto. The mixture was boiled at reflux (110° C.) for a period of about 2 hours during which time 3.9 cc. of water, corresponding exactly to the theory, was collected. The flask and contents thereof were cooled to room temperature, the toluene solution was washed with water to remove the sulfonic acid and the solvent was removed by evaporation in vacuo, the residue comprising bis-diallyl-1,2-cyclohexylidenedioxybenzene.

The cyclohexylidene derivative (13.5 g.) and 23.7 g. of hexachlorocyclopentadiene were placed in a flask and slowly heated at a temperature of 175° C. in an oil bath. At this temperature a small exothermic reaction was noted; however, heating was continued slowly to a maximum of 195° C., another small exothermic reaction occurring at this temperature. At the end of this time the flask and contents thereof were cooled to room temperature and the reaction product, comprising bis-(1,4,5,6,7,7-hexachloro - 5 - norbornen-2-ylmethyl)-1,2-cyclohexylidenedioxybenzene was separated and recovered. The product was subjected to infra-red analysis confirming the above structure. Analysis for chlorine gave the following results:

Calc. for $C_{28}H_{22}O_2Cl_{12}$: Cl, 52.15. Found: Cl, 51.2.

*Example II*

A mixture of sodium hydroxide, catechol, allyl chloride, water and methanol is stirred vigorously and allowed to stand for approximately 16 hours. At the end of this time the mixture is heated to reflux temperature and maintained thereat for an additional two hours while constantly stirring said mixture. At the end of this time water is added and the organic material is extracted with an inert solvent such as benzene. The extracted material is then separated and heated in an oil bath to a temperature of approximately 210° C. and thereafter distilled under reduced pressure.

The desired product, comprising the diallyl catechol is added to a mixture of methyl propyl ketone and toluene which contains a trace of benzene sulfonic acid. This mixture is then heated under reflux for a period of about 2 hours after which the solution is washed with water to remove the acidic material and the solvent is removed by evaporation. The isopentylidene derivative is then heated at a temperature in the range of from about 175° to about 200° C. with hexachlorocyclopentadiene. At the end of the desired residence time the reaction mixture is separated and the desired product, comprising bis-(1,4,5,6,7,7 - hexachloro-5-norbornen-2-ylmethyl)-1,2-isopentylidenedioxybenzene is recovered.

*Example III*

A mixture of potassium hydroxide, water, methanol, catechol and crotonyl chloride is treated in a manner similar to that set forth in Example I above. After the rearrangement step the desired dicrotonyl catechol is reacted with cyclohexanone in the presence of an acidic medium and the cyclohexylidene derivative is thereafter reacted with hexachlorocyclopentadiene in a manner similar to that also set forth above in Examples I and II. The desired product, comprising bis-(1,4,5,6,7,7-hexachloro -5 -norbornen-2-ylethyl)-1,2-cyclohexylidenedioxybenzene is separated and recovered.

*Example IV*

Catechol and allyl chloride are condensed and rearranged in a manner similar to that set forth in Example I above. The desired product of this step, comprising 3,6-diallyl catechol is reacted with cyclohexanone to obtain the cyclohexylidene derivative. This derivative is then reacted with 1,3-dichloro-1,3-butadiene in a manner similar to that set forth above and the desired product, comprising bis - (1,3-dichloro-1-cyclohexen-4-ylmethyl)-1,2-cyclohexylidenedioxybenzene is recovered.

Example V

An insecticidal solution is prepared by dissolving 1 g. of bis-(1,4,5,6,7,7 - hexachloro-5-norbornen-2-ylmethyl)-1,2-cyclohexylidenedioxybenzene in 2 cc. of benzene and adding thereto 100 cc. of water, Triton X–100 being used as the emulsifying compound. This solution is sprayed into a cage containing common houseflies and causes a 100% knock-down.

Similar tests of other insecticides of Examples II to IV show that these compounds, like those of Example I, exhibit the same knock-down ability with essentially equal killing power.

I claim as my invention:
1. 3,6 - bis - (1,4,5,6,7,7-hexachloro-5-norbornen-2-yl-methyl)-1,2-cyclohexylidenedioxybenzene.
2. 3,6 - bis - (1,4,5,6,7,7 - hexachloro-5-norbornen-2-yl-methyl)-1,2-isopentylidenedioxybenzene.
3. A compound of the formula selected from the group consisting of

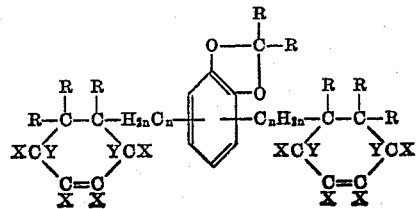

and

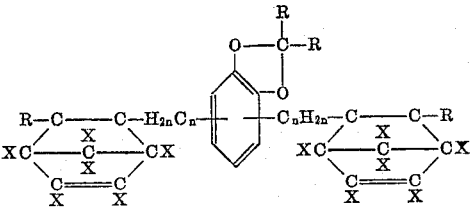

wherein the R substituents are independently selected from the group consisting of hydrogen and alkyl radicals, the X substituents are independently selected from the group consisting of hydrogen, alkyl and halogen radicals, at least one X being halogen, the Y substituents are independently selected from the group consisting of hydrogen, haloalkyl and alkyl radicals, and $n$ is an integer of from 0 to 8.

4. Bis - (1,4,5,6,7,7-hexachloro-5-norbornen-2-ylethyl)-1,2-cyclohexylidenedioxybenzene.
5. Bis - (1,3 - dichloro-1-cyclohexen-4-ylmethyl)-1,2-cyclohexylidenedioxybenzene.

References Cited in the file of this patent
UNITED STATES PATENTS
2,923,717    Bloch et al. _____ Feb. 2, 1960

OTHER REFERENCES

W. J. Hickinbottom: Reactions of Organic Compounds, Longmans, Green and Co., New York, 1948, page 93.

Richter: Textbook of Organic Chemistry, Wiley, New York, 1952, page 443.

Fields: "J. Am. Chem. Soc.," vol. 76, pp. 2709–2710 (1954).